(No Model.)

W. STONE.
PACKAGE CARRIER.

No. 473,531. Patented Apr. 26, 1892.

Witnesses
Gavin A. Forrest.
Thomas W. Hobday

Inventor
Willard Stone
By Thomas W. Hobday
his Attor.

UNITED STATES PATENT OFFICE.

WILLARD STONE, OF HARTFORD, CONNECTICUT.

PACKAGE-CARRIER.

SPECIFICATION forming part of Letters Patent No. 473,531, dated April 26, 1892.

Application filed May 5, 1891. Serial No. 391,668. (No model.)

*To all whom it may concern:*

Be it known that I, WILLARD STONE, a citizen of the United States, and a resident of Hartford, in the county of Hartford and State of Connecticut, have invented a new and useful Bundle-Carrying Handle, of which the following is a specification.

The objects of my invention are, first, to construct a carrying-handle of leather or any other suitable material in a manner that when a parcel is bound by a cord or strap the end or ends may be drawn or forced between bows or layers provided on or a part of said handle, which will have a biting or retaining element on said cord or strap and securely hold the same; second, my handle to dispense with buckling straps or tying knots; third, the layers or bows to be brought together and secured by any suitable securing device; fourth, to be provided with rings or any other suitable means that will facilitate immediate binding of a bundle; fifth, to have one or more layers or bows. These objects I attain by the mechanism illustrated in the accompanying drawings, in which—

Figure 1:
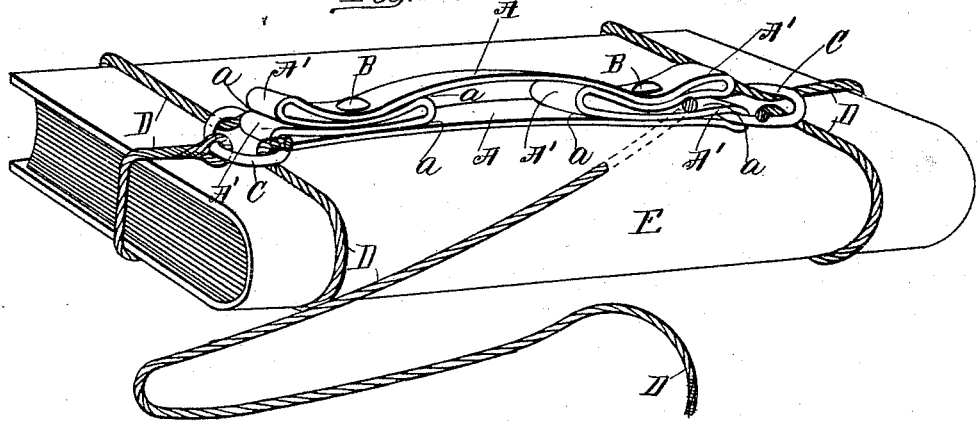
Figure 2:
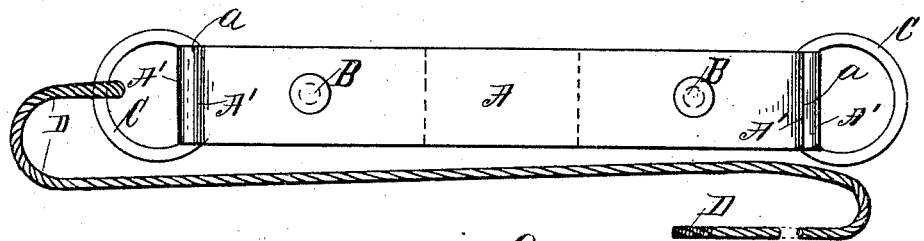
Figure 3:
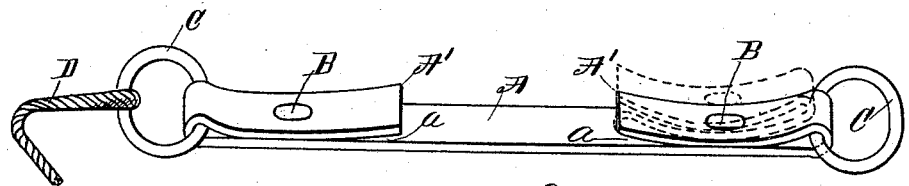

Figure 1 is a representation of a bundle-carrying handle drawn in perspective and made in accordance with the objects of my invention. Fig. 2 is a plan view of my carrying-handle as illustrated in Fig. 1. Fig. 3 is a modification of Fig. 1.

Similar letters refer to similar parts throughout the several views.

A denotes the handle, which is constructed of leather or any other suitable material, the design of which, as illustrated in Fig. 1, is made from one continuous length, having its consecutive bows or layers A' secured by a rivet B or any other suitable securing device, as it is optional what means is used to bring the parts A' and A firmly together.

The bows or layers A' involve the body of my invention, for they are to dispense with buckling straps or tying knots, which is customary and very annoying to traveling agents, for at times they have to make holes in their straps to engage the tongue of the buckle, thereby weakening the same and making the straps liable to break at any moment when in use, for all straps crack and break where holes are punched therein. Others have to seek the assistance of a cord and use the old way of securing the parcel by tying the respective ends of the said cord.

The biting or retaining element upon the cord or strap D is effected by drawing the same through or between the bows or layers A', which is illustrated in Fig. 1 as being drawn or forced at one end only. The said cord or strap D can be wound around and within the mouths a of said layers A'—to wit, as long as the jamming caused by the bows or layers A' overcomes that of the drawing element caused by the weight of the bundle E on said cord. By so doing the manipulation of buckles or the tying of knots is dispensed with, which is the object of my invention.

In order to make my handle A complete, I provide it with a ring C at its respective ends A' to facilitate the immediate binding of the parcel E and which will admit of a cord or strap D—to wit, the ring C is not a very essential device, as it is optional whether rings, eyelets, or studs are used to accomplish the aforesaid binding.

The handle A, as illustrated in Fig. 3, is designed to have the bows or layers A', one or more, with their respective mouths or openings a independent of each other to utilize each bow of layers A' and respective ends 1 and 2 of the handle A—to wit, which cannot be conveniently attained by the handle, as illustrated in Fig. 1, for it is necessary to use said handle as one complete bow of layers, whereas in Fig. 3 the bow or layers A' are compound with the handle A, which can be stiffened or made rigid by uniting suitable stiffening material—such as double-ply leather, metallic plate, &c.—across the body of the handle A, if necessary.

Having described my invention, I claim—

A parcel-carrier formed of a continuous strip of suitable material which is gathered in folds or loops at its extremities, the folds or loops of each series being rigidly secured to each other and having rings in two opposite folds for engaging a suitable binding cord or strap.

WILLARD STONE.

Witnesses:
THOMAS W. HOBDAY,
GABIN A. FORREST.